UNITED STATES PATENT OFFICE.

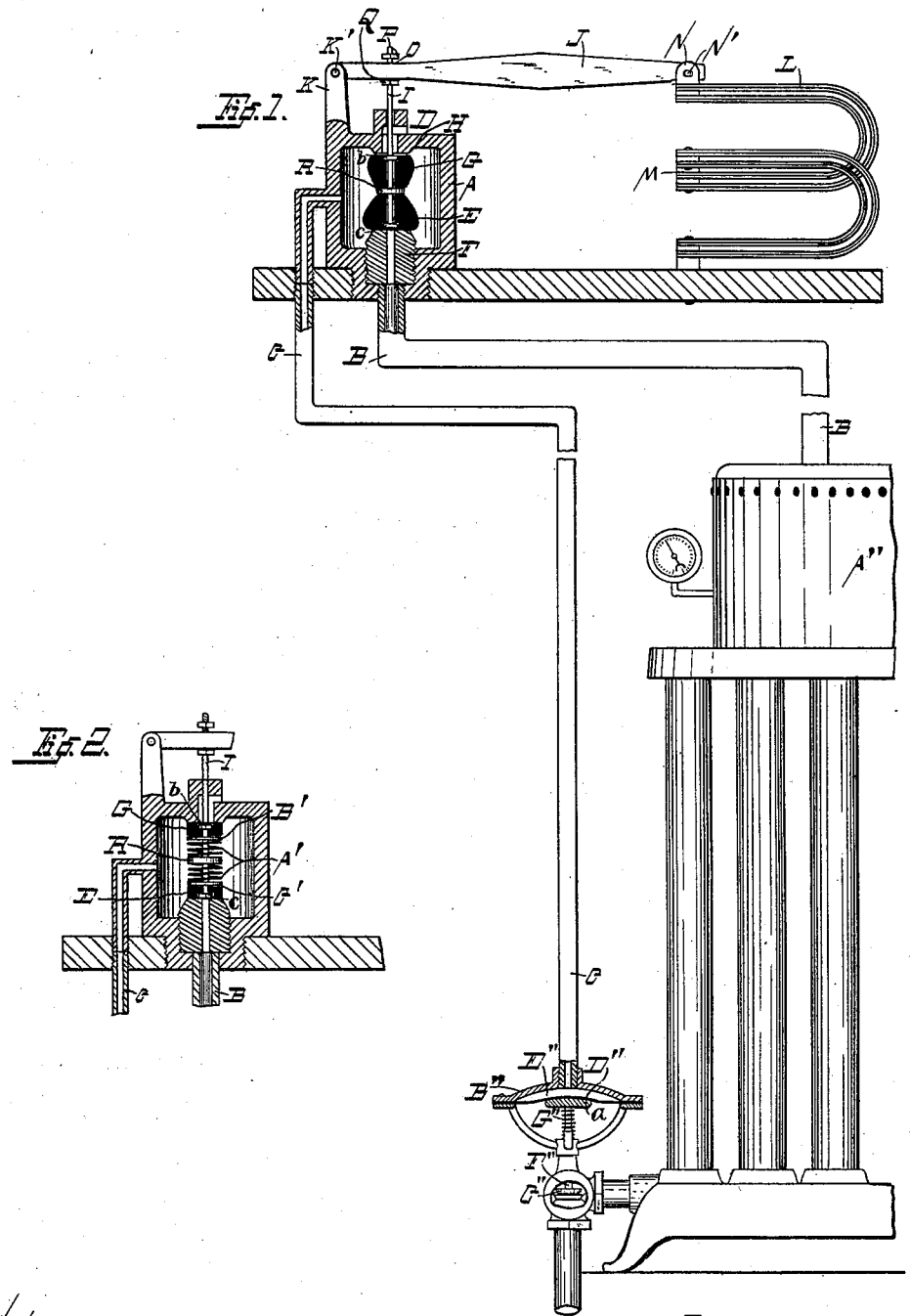

ALFRED ROESCH, OF BROOKLYN, NEW YORK, ASSIGNOR TO THE DAVIS & ROESCH TEMPERATURE CONTROLLING COMPANY, OF NEW JERSEY.

AIR-CONTROLLING DEVICE.

SPECIFICATION forming part of Letters Patent No. 595,654, dated December 14, 1897.

Application filed January 6, 1897. Serial No. 618,160. (No model.)

*To all whom it may concern:*

Be it known that I, ALFRED ROESCH, a citizen of the United States, residing at Brooklyn, in the county of Kings and State of New York, have invented new and useful Improvements in Air-Controlling Devices, of which the following is a specification.

My invention relates to improvements in that class of air-controlling devices which are used to control the passage of compressed air from an air-reservoir both to and from an air-actuated steam-valve.

The object of my invention is to provide a more simple and efficient means for controlling compressed air without permitting it to escape as the position of the air-controlling valves is reversed or changed.

The construction of my invention is further explained by reference to the accompanying drawings, in which—

Figure 1 represents a vertical section of my air-controlling device connected by an operating-lever with a thermostat, said air-controlling device being also shown in connection with a compressed-air tank, a heat-radiator, and a steam-controlling valve mechanism. Fig. 2 is a modified form of the device shown in Fig. 1.

Like parts are referred to by the same reference-letters in both views.

A represents an air-chamber through which compressed air is conducted from compressed-air tank A″ to and from a steam-controlling valve mechanism B″, hereinafter described. B is an inlet air-duct through which compressed air is led from the air-tank A″ to the air-chamber A. C is an open side duct through which compressed air is led from said air-chamber to the air-controlling valve mechanism B″ and from thence back again to said air-chamber.

D is a discharge-duct through which the compressed air which has done its work is permitted to escape. The admission and escape of the compressed air to and from the air-chamber are controlled by a double or two-faced elastic valve, which consists of two so-called "secondary" valves E and G.

Referring to Fig. 1, the valves E and G are held in place upon the stem I against the central flange R by the respective side flanges $b$ and $c$, all of which flanges R, $b$, and $c$ are rigidly secured to said stem.

The passage of air from the inlet-duct B to the side duct C is controlled by the secondary valve E, which when in its normal condition closes the seat F, but when said valve is raised from its seat it permits the compressed air entering through the pipe B to pass into said chamber A and from thence through the open side duct C to the air-actuated steam-controlling valve.

The escape of the compressed air from the steam-controlling valve mechanism is controlled by the secondary valve G, which valve, when in its normal condition, closes the valve-seat H, but when forced downward from its seat it permits the compressed air which has done its work to escape through the duct D.

The valves E and G are both secured to and actuated by the single valve-stem I. Said valves E and G are preferably made of soft rubber or other elastic material of such dimensions that they require slight compression before being put in place, so that when in place they expand of their own elasticity and simultaneously close both inlet and outlet valve-ports F and H, thus preventing the escape of compressed air in either direction through said valve-chamber. When, however, the valve-stem I is raised, the upper valve G is closed more firmly when the lower valve E is opened, thus permitting the compressed air to pass from the duct B to the side duct C, as stated, while by a reverse movement of the valve-stem the lower valve E is closed more firmly while the upper valve G is opened, thus permitting the air which has done its work to escape. The valve mechanism B″ consists of the air-chamber E″, diaphragm D″, valve-stem F″, having an enlarged bearing-surface $a$ and spiral spring G″, the steam-valve C″ being closed by the downward pressure of compressed air on the diaphragm D″ as it enters said air-chamber E″ and opened by the action of the spiral spring G″ as said compressed air is permitted to escape. It will be understood that the elasticity of the respective valves is such as to permit of the required movement.

J is an actuating-lever through which motion is communicated to the air-controlling valves from a thermostat or other motive power of ordinary construction. The lever J is preferably supported at one end from the air-chamber by the lugs K and pivotal bolt K', and it is connected at its other end with the arm L of the thermostat M by the lugs N and pivotal bolt N'.

The valve-stem I is secured to the lever J within the aperture O by the nuts P and Q. The stem I is preferably connected to said lever nearest its fulcrumed end, that the power of the thermostat or other actuating mechanism over the air-controlling valve may thereby be increased in proportion to the excess of movement of the thermostat over the valve. It is obvious that the movement of the thermostat will be communicated more or less promptly to the air-controlling valve in either direction by the adjustment of the nuts P and Q upon the stem nearer to or farther from said actuating-lever.

While both secondary valves E and G may, if desired, be made of a single piece of rubber or other elastic material, I preferably form them of two separate pieces E and G, as shown, which pieces are separated by a partition or disk R, which disk is rigidly attached to the stem and serves to communicate the movement of the stem to the valves, by which I am enabled to fit such valves more loosely upon the stem than otherwise, whereby such valves are permitted to move freely on their stems as they are compressed and expanded.

In the modified form shown in Fig. 2 the secondary valves G and E are made thinner and more elastic, and the intervening space between them is provided with spiral springs A' and two bearing plates or disks B' and C'. The disks B' and C' are loosely fitted upon the stem I and move upon it as the respective valves are compressed, while the spiral springs serve to support said disks and valves. By this arrangement greater elasticity and an increase of movement are attained than could otherwise be by the use of the rubber valves alone. The spiral springs A' are separated by the central flange R, which springs have bearings against said flange in substantially the same manner as the rubber valves shown in Fig. 1. The valve-stem I is also provided with valve-retaining flanges b and c, all of which flanges are rigidly affixed to said stem, as in Fig. 1.

While I have described my invention as an air-controlling device for actuating steam-controlling valves, it is obvious that said device is equally adapted for controlling gas or other fluids under pressure when used for the same or other similar purposes.

Having thus described my invention, what I claim as new, and desire to secure by Letters Patent, is—

1. In a device for controlling compressed air, the combination of an air-chamber provided with inlet and outlet air-ducts; a double or two-faced elastic valve located between, and adapted to simultaneously close the ports of said inlet and outlet ducts; an open side duct communicating from said air-chamber, both to and from a steam-controlling valve; a valve-supporting stem connecting with said double or two-faced valve within said air-chamber, from the exterior; and means for actuating said elastic valves, substantially as and for the purpose specified.

2. In a device for controlling compressed air, the combination of an air-chamber provided with inlet and outlet air-ducts; a double or two-faced elastic valve located between, and adapted to simultaneously close the ports of said inlet and outlet ducts, a valve-supporting stem connected with said double two-faced valve, within said chamber, provided with a flange secured to said stem at its center, and two side flanges adapted to hold and compress said double elastic valves, said elastic valves being loosely fitted upon their supporting-stem, and separated from each other by said central flange, substantially as and for the purpose specified.

In testimony whereof I affix my signature in the presence of two witnesses.

ALFRED ROESCH.

Witnesses:
CHARLES W. COUSE,
WALTER J. WOOD.